July 29, 1969     E. J. WELLAUER ETAL     3,457,731
FLEXIBLE GLAND COUPLING
Filed Aug. 15, 1967     2 Sheets-Sheet 1
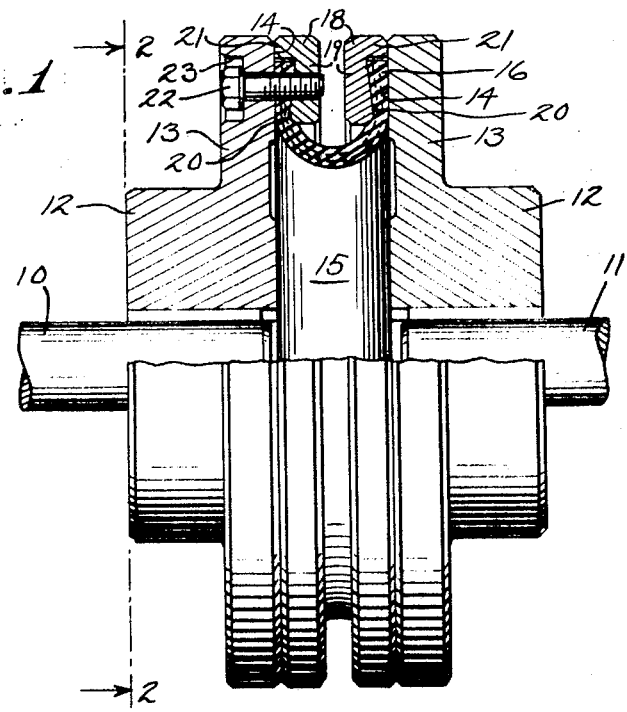
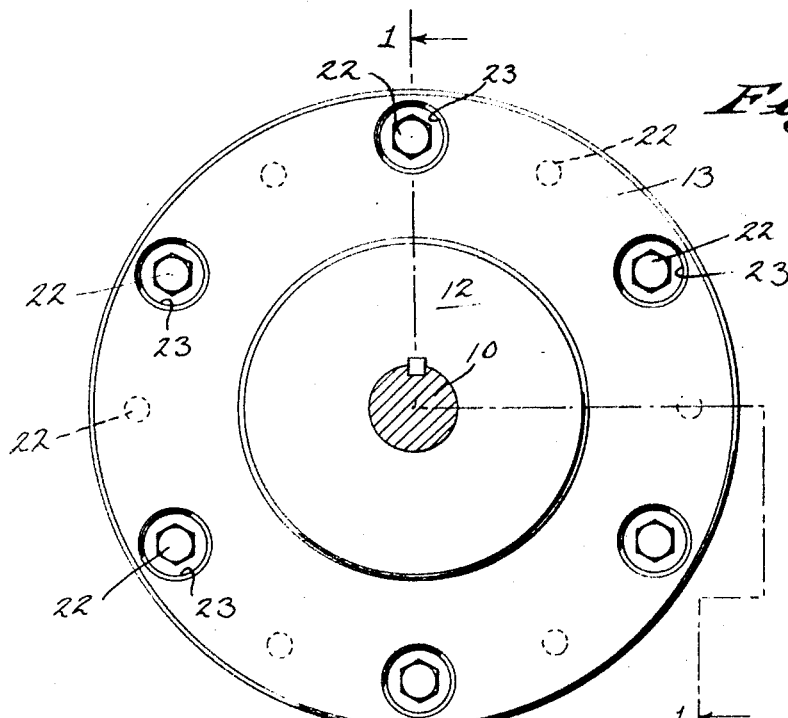
INVENTORS
EDWARD J. WELLAUER
QUENTIN W. HEIN
ALFRED G. BADE
GLENN C. POKRANDT
BY
ATTORNEY July 29, 1969  E. J. WELLAUER ETAL  3,457,731
FLEXIBLE GLAND COUPLING
Filed Aug. 15, 1967  2 Sheets-Sheet 2

INVENTORS
EDWARD J. WELLAUER
QUENTIN W. HEIN
ALFRED G. BADE
GLENN C. POKRANDT
BY
Thomas W. Ehrmann
ATTORNEY

United States Patent Office 3,457,731
Patented July 29, 1969

3,457,731
FLEXIBLE GLAND COUPLING
Edward J. Wellauer, Wauwatosa, Quentin W. Hein, Waukesha, Alfred G. Bade, Brookfield, and Glenn C. Pokrandt, Milwaukee, Wis., assignors to The Falk Corporation, Milwaukee, Wis., a corporation of Wisconsin
Filed Aug. 15, 1967, Ser. No. 660,660
Int. Cl. F16d 3/52
U.S. Cl. 64—11                                   16 Claims

ABSTRACT OF THE DISCLOSURE

A flexible gland coupling is formed of a pair of spaced hubs each secured to one of the shafts to be coupled. The hubs have facing inner surfaces which are perpendicular to the axes of the shafts. A corded elastomer, annular gland is disposed between the hubs, and is U-shaped in cross section with straight side portions of uniform width that extend radially outwardly from the center of the coupling. Each side portion of the gland is held in place against a respective hub by a clamp ring that is generally L-shaped in cross section. The shorter leg of the clamp ring abuts against a respective hub and the longer leg extends radially inwardly therefrom to clamp the respective side portion of the gland between the longer leg and the inner surface of the hub. The gland engaging surface of the longer leg of the clamp ring is tapered radially outwardly so that the side portion of the gland is compressed most fully at a point adjacent the radially inner periphery of the clamp ring. Cap screws extend through the hub, the side portion of the gland, and are threadedly received within the longer leg of the clamp ring.

Background of the invention

This invention relates to flexible gland shaft couplings, and more particularly to an improved means of anchoring a flexible gland to a coupling hub and also relates to a coupling which incorporates such improved anchoring.

Flexible shaft couplings which utilize an elastomer gland to join hubs secured to aligned shafts have been used for many years. Commonly, the gland is clamped or otherwise secured between the hubs and functions to transmit torque from a driving shaft to a driven shaft. Such couplings can accept angular and axial shaft misalignments and have the additional advantage of being able to dampen the transmission of shock loads from one shaft to the other. Obviously, the flexible gland of such a coupling must be able to withstand the torque to be transmitted. However, a common source of failure of such couplings results not from the failure of the gland under torque directly but rather by having the gland pull away from its attachment to one or both of the hubs.

Much effort has been directed to the design of the attachment or anchoring of the gland to the hubs because of the presence of this problem. The suggested solutions have incorporated either complex clamps or grips for the clamping elements or intricate shapes of glands to prevent pull out of the glands. Such solutions have uniformally led to complex structures of considerable cost.

This invention achieves a most satisfactory gripping of the gland by means of an uncomplex structure and realizes cost reductions because of the simplified form of gland which can be used. A coupling in accordance with this invention also achieves an excellent division of load within the gland and between the clamping components of the coupling.

Summary of the invention

A coupling in accordance with the invention includes a flexible gland having a mounting portion of uniform thickness which is clamped between a gland engaging surface of a hub and a spaced gland engaging surface of a clamp member, with the gland engaging surfaces being so formed as to define a tapered space therebetween.

More specifically, a coupling in accordance with the invention may include an annular flexible gland that is U-shaped in cross section with the sides of the gland extending radially outwardly and having a uniform thickness, each of said sides is clamped between an annular clamp member and an opposing face of a hub which is mountable on a respective one of the shafts to be coupled with the space between the clamp and the hub increasing radially outwardly of the coupling.

The invention furthermore contemplates the use of clamping members which are L-shaped in cross section with one leg extending to engage the gland mounting portion and with the other leg abutting against the hub when the gland is clamped in place to transmit torque between the clamp member and the hub.

The invention also includes the establishment of practical maximum and minimum angles of taper of the space between each hub and respective clamp member for practicing the invention.

In the specification and the accompanying drawings a preferred embodiment of the invention is disclosed, and the invention is shown and described in such clear, concise and exact terms as to enable a person skilled in the art to practice the invention. However, the embodiment disclosed represents only the best mode presently contemplated for practicing the invention and the invention is not limited to the specific embodiment.

Brief description of the drawings

FIG. 1 is a side view in elevation and partially in vertical section of a coupling in accordance with this invention; FIG. 2 is an end view in elevation of the coupling of FIG. 1.

Description of the preferred embodiment

Figure 3:
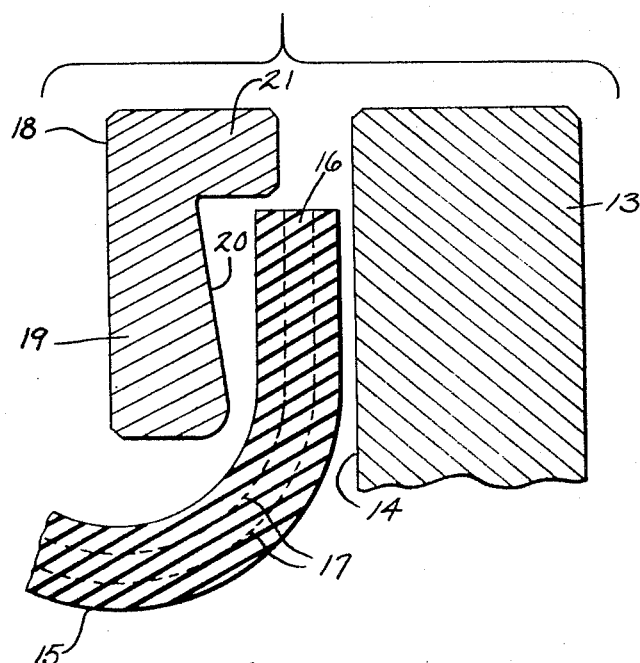
FIG. 3 is an enlarged view of a portion of the coupling illustrating the relationship of the hub, gland, and clamp member when unconnected.

The coupling is adapted to connect generally aligned driving and driven shafts 10 and 11 which are spaced apart at their opposing ends to accommodate the coupling. The coupling is comprised of a pair of identical hubs 12 each secured, as by keys, to a respective one of the shafts 10 and 11. The hubs 12 each include a radially extending flange 13 and the flange 13 is formed with a planar gland engaging inner surface 14 which is perpendicular to the axis of the coupling. The inner surfaces 14 of the two hubs 12 oppose each other and are spaced apart to receive an annular flexible gland 15. The gland 15 is formed with a U-shaped cross section with spaced side portions 16 extending radially outwardly and with the bight defining the inner diameter of the gland 15.

The gland 15 is formed of an elastomer such as natural rubber and includes an suitable number of plies 17 of reinforcing cord. The cord can be a nylon and, ideally, the reinforcing cord is laid with the cords of one ply at an angle to the cords of another ply. The gland is formed with a uniform thickness and with straight parallel side portions 16. A gland having a uniform thickness may be constructed in a single set-up using common manufacturing techniques. Such a gland is much cheaper to manufacture because it is not necessary to provide additional cord plies or elastomer at different points as is necessary in prior art devices.

The hubs 12 are spaced apart in a distance equal to the normal width of the gland 15 and each of the side portions 16 is in contact with a respective inner surface 14 of a hub 12. A pair of identical annular clamp members 18 cooperate with the hubs 12 to grip the side portions 16. The clamp members 18 are formed with a generally L-shaped cross section with a long leg 19 having an inner gland engaging surface 20 opposing the inner surface 14 of respective hub 12. This gland engaging surface 20 tapers radially outwardly. A shorter leg 21 of each clamp member 18 is adapted to abut against the inner surface 14 of a respective hub 12 and the clamp member 18 is held in place by cap screws 22 which extend through openings in the flange 13 and a gland side portion 16 and are threadedly received in the long leg 19 of the clamp member 18. Suitable recesses 23 are provided in an outer surface of each flange 13 to receive the heads of the cap screws 22 and the openings for the cap screws in one side portion 16 of the gland 15 are staggered with respect to such openings in the other side portion 16.

The clamp member 18 is so shaped and dimensioned that when the clamp member 18 is in place and has been secured by the cap screws 22 to have the shorter leg 21 abut the flange 13, the minimum distance between the opposing surfaces 14 and 20 is substantially less than the normal thickness of the gland side portions 16. Thus, each side portion 16 is compressed between a clamp member 18 and a flange 13 with the maximum compression adjacent the inner diameter of the clamp member 18. Because of the taper, the degree of compression decreases radially outwardly to a minimum at the radially outer periphery of each gland side portion 16.

The minimum distance between the surfaces 14 and 20 when the clamp member 18 is fully seated is selected to provide a degree of compression which will result in a permanent deformation, or "set," to the respective side portion at that point. This has proven to be a most effective means of anchoring the gland 15 to the hubs 12. Tests have shown that there is excellent holding strength which prevents radial pull-out of the side portions 16 upon the application of torque to the coupling. By having the short leg 21 of each clamping member abut against a hub flange 13 a limit is established on the amount of compression which will be exerted upon the gland side portions 16. Load is carried from and to the gland 15 by the friction between the contacting surfaces of side portions 16 and the flanges 13 and the clamping members 18. Also, load is carried between the flanges 13 and clamping members 18 by means of the metal-to-metal contact therebetween. The result is a most desirable division of load into the plies 17 from both outer surfaces of the gland 15 and the relieving of the cap screws 22 from much of the shear load and resultant bending.

Centrifugal force acting on the gland 15 will have the effect of subtracting from the thrust resulting from torque. If the gland was inverted, similar to some prior devices, centrifugal force would add to the thrust to further urge the sides of the gland away from their attachment to the hubs.

Figure 4:
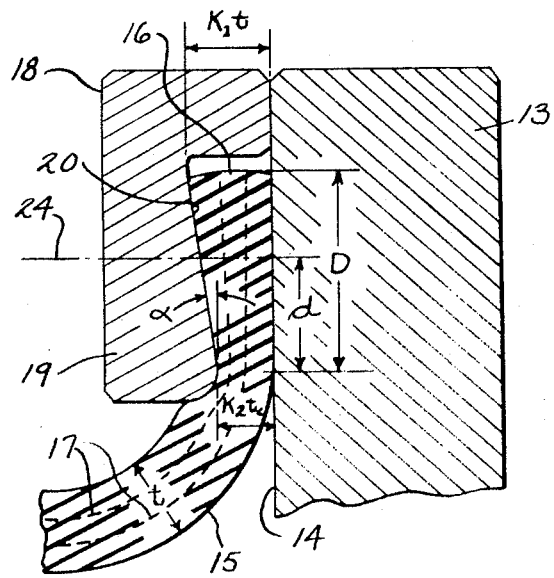
FIG. 4 is a view similar to FIG. 3 except showing the elements joined together.

While good holding strength is obtained in the coupling by use of the tapered space for clamping the straight side portions of the gland, there are practical maximum and minimum degrees of taper. With reference to FIG. 4, the minimum degree of taper should be large enough so that no permanent deformation is induced in the gland side portions 16 at the radially outermost elements of the side portions. The reason for this is that at smaller angles of taper the clamp forces on the cap screws 22 become extremely large. Such a minimum angle of taper may be determined from the geometry of the coupling as illustrated in FIG. 4. The minimum value of the angle $\alpha$ by which the opening for a side portion 16 deviates from a parallel relationship can be expressed by the following formula:

$$\alpha_{\min.} = \arctan \frac{k_1 t - k_2 t_c}{D}$$

In the above formula, $t$ represents the normal thickness of the gland side portion 16, D represents the radial distance from the point of maximum compression (i.e. the point of minimum distance between the clamping member 18 and the flange 13) to the outer diameter of the gland, $t_c$ represents the total thickness of the chords in the gland, $k_1$ is a constant less than one representing the amount of deformation which can be withstood by the gland without permanently deforming the same, and $k_2$ is a constant selected to represent the thickness of the least amount of elastomer material necessary at the point of maximum compression to protect the cords from rupture. Thus, the factor $k_1 t$ represents the limit of the thickness to which the gland may be compressed without permanently deforming the same and the factor $k_2 t_c$ represents the minimum thickness to which the gland can be compressed without destroying the cords. $k_2$ may be chosen to have a value of 2 and $k_1$ may have a value of about .75.

The maximum practical angle of taper would be that in which there is no compression of the gland side portion 16 at the center line 24 of the cap screws 22 since beyond this point the variation in clamping force on the cap screws to obtain a given amount of gland compression becomes too great to be of practical value. This may be expressed by the following formula:

$$\alpha_{\min.} = \arctan \frac{t - k_2 t_c}{d}$$

wherein $d$ is the radial distance from the point of maximum compression to the center line 24 of the cap screws 22.

Between the maximum and minimum practical angles of taper there is a preferred degree of taper which has been found to be that which will result in the compression varying from a maximum to zero at the radially outermost point of the gland side portions 16. It can be seen that this preferred angle of taper can be expressed by the following formula:

$$\alpha_{\text{preferred}} = \arctan \frac{t - k_2 t_c}{D}$$

A coupling in accordance with this invention provides a most effective means of transmitting torque between shafts. The features of earlier flexible gland couplings (i.e. accommodation of shaft misalignment and shock load dampening) are retained while increasing the capacity of the coupling by providing an effective anchoring of the gland. The excellent anchoring is achieved by means of a simple structure which can be manufactured at considerable reduction in cost as compared with previous couplings.

While it is preferable to have the taper provided solely in the clamp members 18, it can be seen that the taper may be provided in a different manner. For example, the clamp could have a face perpendicular to the axis of the coupling with the taper provided in the inner surface of the hub flange. This would reduce the holding force somewhat because the force tending to pull the gland away from its mounting would act along a tangent to the arc of the gland. Also, the taper could be provided by tapering the opposing surfaces of both the clamp member and the hub flange.

The cap screws 22 could extend from the flange 13 through the shorter leg 21 of the clamp member 18. However, excessive compression forces would tend to bow the longer leg and a larger diameter coupling would be required. The gland 15 need not be formed in one piece, although this is the most economical embodiment.

The invention has been shown incorporated in a coupling including identical hubs mountable on shafts. It would, of course, be possible to secure the flexible gland between a hub on a shaft and a flywheel on a second shaft. Likewise, the means of anchoring the flexible gland can be applied to other configurations of shaft couplings.

We claim:
1. A flexible gland coupling for connecting a pair of shafts, comprising:
a pair of hubs each adapted to be connected to one of said shafts, said hubs having spaced inner gland engaging surfaces;
an annular flexible gland disposed between said hubs, said gland being U-shaped in cross section with the bight thereof disposed radially inwardly of the coupling and with radially outwardly extending spaced side portions of uniform thickness, each of said side portions being disposed against said gland engaging surface of a respective one of said hubs;
an annular clamp member disposed axially inwardly of each of said legs and each clamp member having a gland engaging surface disposed against a respective one of said side portions;
and connecting means joining each of said clamp members to a respective one of said hubs to clamp one of said side portions therebetween, said gland engaging surfaces of each hub and clamp member being so formed as to define an outwardly tapered space therebetween with the minimum distance therebetween being radially inwardly of the coupling and being less than the normal thickness of said side portions.

2. A flexible gland coupling in accordance with claim 1 wherein each of said side portions is compressed between a respective clamp member and hub at said point of minimum distance an amount sufficient to permanently deform said side portions.

3. A flexible gland coupling in accordance with claim 2 wherein said gland is formed of an elastomer having reinforcing cord therein, and wherein the amount of compression of each of said side portions at said point of minimum distance is less than that which would rupture said cord.

4. A flexible gland in accordance with claim 2 wherein said gland engaging surfaces of each hub and clamp member being so formed that said outwardly tapered space therebetween increases uniformly from said point of minimum distance therebetween.

5. A flexible gland coupling in accordance with claim 4 wherein each of said clamp members is formed with a radially inwardly extending leg that engages a respective one of said side portions and an axially extending leg that abuts against said inner gland engaging surface of a respective one of said hubs.

6. A flexible gland coupling in accordance with claim 5 wherein said connecting means comprises bolt means extending through said hub, said side portion and said radially inwardly extending leg.

7. A flexible gland coupling in accordance with claim 4 wherein the distance between said gland engaging surfaces of each hub and clamp member at the radially outer periphery of said side portions is the same as the uncompressed thickness of said side portions.

8. A flexible gland coupling in accordance with claim 4 wherein the distance between said gland engaging surfaces of each hub and clamp member at the radially outer periphery of said side portions is greater than that which would permanently deform said side portions.

9. A flexible gland coupling in accordance with claim 6 wherein the distance between said gland engaging surfaces of each hub and clamp member at the center line of said bolt means does not exceed the uncompressed thickness of said side portions.

10. A flexible gland coupling for connecting a pair of shafts, comprising:
a pair of hubs each adapted to be connected to one of said shafts, said hubs having spaced inner surfaces that are perpendicular to the axis of said coupling;
an annular flexible gland disposed between said hubs, said gland being U-shaped in cross section with radially outwardly extending spaced gland side portions of uniform thickness;
a pair of annular clamp members each including a radially inwardly extending portion having a gland engaging surface spaced from and radially outwardly inclined relative to said inner surface of a respective one of said hubs, each of said gland side portions being disposed between said inner surface of one of said hubs and said gland engaging surface of one of said clamp members;
and bolt means extending through each hub, gland side portion, and radially inwardly extending portion of said clamp member to clamp said gland side portions between said hubs and clamp members.

11. A flexible gland coupling in accordance with claim 10 wherein each of said clamp members also includes an axially extending portion that abuts against said inner surface of a respective one of said hubs, and wherein each of said gland side portions is compressed at the point of minimum distance between said inner surface and said gland engaging surface an amount sufficient to permanently deform said gland side portion.

12. A flexible gland coupling in accordance with claim 11 wherein the distance between said inner surface and said gland engaging surface at the radially outer periphery of said gland side portion is the same as the uncompressed thickness of said gland side portion.

13. A flexible gland coupling in accordance with claim 11 wherein the distance between said inner surface and said gland engaging surface at the radially outer periphery of said gland side portion is greater than that which would permanently deform said gland side portion.

14. A flexible gland coupling in accordance with claim 11 wherein the distance between said inner surface and said gland engaging surface at the centerline of said bolt means does not exceed the uncompressed thickness of said gland side portion.

15. In a flexible gland shaft coupling, the combination comprising: an annular flexible gland having a mounting portion of uniform thickness adjacent one end of the gland; a hub adapted to be connected to a shaft and having a gland engaging surface; a clamp member that is generally L-shaped in cross section with one leg having a gland engaging surface that is spaced from said gland engaging surface of said hub and with a second leg that abuts against said gland engaging surface of said hub, said gland mounting portion being disposed between said gland engaging surfaces; and connecting means joining said clamp member and said hub to clamp said gland mounting portion therebetween, said gland engaging surfaces of said hub and said clamp member being so formed as to define a tapered space therebetween which increases uniformly from a minimum distance adjacent the end of said one leg of said clamp member that is remote from said second leg to a maximum adjacent said second leg, said minimum distance being less than the normal thickness of said mounting portion.

16. A flexible gland shaft coupling in accordance with claim 15 wherein said gland mounting portion is compressed between said hub and said clamp member at said point of minimum distance an amount sufficient to permanently deform said gland mounting portion.

References Cited

UNITED STATES PATENTS

| 1,606,514 | 11/1926 | Crist | 64—11 |
| 3,178,906 | 4/1965 | Ricketts | 64—11 |
| 3,368,835 | 2/1968 | Hackforth | 64—11 |

FOREIGN PATENTS

| 888,339 | 8/1953 | Germany. |
| 376,727 | 5/1964 | Switzerland. |

HALL C. COE, Primary Examiner

PO-1050
(5/69)

UNITED STATES PATENT OFFICE
CERTIFICATE OF CORRECTION

Patent No. 3,457,731          Dated July 29, 1969

Inventor(s) EDWARD J. WELLAUER et al.

It is certified that error appears in the above-identified patent and that said Letters Patent are hereby corrected as shown below:

Column 2,    Line 63,    for "an" read --a--

Column 4,    Line 11,    for "chords" read --cords--

Column 4,    Line 31    for "$\alpha_{min.} =$" read -- $\alpha_{max.} =$"

SIGNED AND
SEALED

OCT 28 1969

(SEAL)
Attest:

Edward M. Fletcher, Jr.          WILLIAM E. SCHUYLER, JR.
Attesting Officer          Commissioner of Patents